Patented May 17, 1927.

1,629,002

UNITED STATES PATENT OFFICE.

KARL SCHÖLLKOPF, OF DUSSELDORF-OBERKASSEL, GERMANY, ASSIGNOR TO RHEINISCHE KAMPFER-FABRIK GESELLSCHAFT MIT BESCHRANKTER HAFTUNG, OF DUSSELDORF-OBERKASSEL, GERMANY.

MANUFACTURING MENTHOL.

No Drawing. Original application filed November 28, 1922, Serial No. 603,853, and in Germany March 11, 1922. Divided and this application filed June 26, 1926. Serial No. 118,833.

In my copending application for Letters Patent Serial No. 603,853 filed November 28th, 1922 and the application divided from it. Serial No. 118,834, filed June 26th, 1926, I have described the process for manufacturing racemic menthol, consisting in firstly heating thymol in presence of catalysts promoting the hydrogenation with hydrogen under pressure, secondly separating by physical processes from the reaction product the crystallizable, crystalline racemate of menthol and thirdly subjecting the remaining liquid, noncrystallizable mixture of isomeric menthols to a new hydrogenation process with catalysts under pressure, if desired after having been added to fresh thymol.

The present process consists in heating thymol in presence of catalysts promoting the hydrogenation with hydrogen under pressure, separating by physical processes from the reaction product the crystallizable crystalline racemate of menthol and heating the remaining liquid, noncrystallizable mixture of isomeric menthols, with an alkaline metal mentholate to temperatures above 100 degrees centigrade, preferably to 200–300 degrees centigrade. The reaction product is distilled with steam and the distillate subjected to a fractional distillation.

I may use as alkaline metal mentholate potassium mentholate or sodium mentholate and may prepare them from potassium metal or sodium metal, added to any menthol (for instance the liquid menthol mixture obtained and separated, or not separated, from the hydrogenation of thymol).

Example: 25 kilograms thymol are heated with 500 grams nickel catalysts (platinum, palladium, cobalt catalysts) with hydrogen to about 200 degrees centigrade under a pressure of 5–30 atmospheres. I may carry out the process in an autoclave and agitate the mass. After sufficient amounts of hydrogen having been absorbed, one separates the product of hydrogenation from the catalysts by distillation or filtration and separates the menthol from the liquid menthols mixture either by a freezing process or by fractional distillation.

By the freezing process (for instance at zero or minus five degrees centigrade) the menthol is solidified, whereas the liquid menthols mixture remains fluid and may be decanted or otherwise separated from the crystallized menthol. By the fractional distillation one may obtain 15 kilograms inactive menthol (racemate) and 10 kilograms liquid menthols mixture (a mixture of various isomeric menthols). The latter named mixture is heated with 300 grams sodium metal during about 20 hours to about 300 degrees centigrade. The reaction product, consisting of about 50 parts by weight inactive menthol (racemate) and 50 parts by weight liquid menthols mixture is distilled with steam and the distillate is subjected to fractional distillation. One may obtain about 50 parts by weight of inactive menthol of melting point 34 degrees centigrade.

The liquid menthols mixture separated from the inactive menthol may be added to fresh thymol and subjected to hydrogenation by heating with catalysts promoting the hydrogenation and hydrogen under pressure.

I claim:—

The process for manufacturing inactive menthol which consists in heating thymol with catalysts promoting the hydrogenation and hydrogen under pressure, separating the inactive menthol from the liquid menthols mixture, heating the latter with an alkaline metal mentholate, subjecting the reaction product to steam distillation and fractionating the distillate.

In testimony whereof, I have signed my name to this specification.

KARL SCHÖLLKOPF.